Nov. 12, 1946.   W. C. ROTHKRANZ   2,411,001
DENTAL PRECISION BRIDGE DEVICE
Filed Sept. 30, 1943

INVENTOR.
WILLIAM C. ROTHKRANZ
BY
ATTORNEY.

Patented Nov. 12, 1946

2,411,001

UNITED STATES PATENT OFFICE 2,411,001

DENTAL PRECISION BRIDGE DEVICE

William C. Rothkranz, Bronx, N. Y.

Application September 30, 1943, Serial No. 504,346

10 Claims. (Cl. 32—5)

This invention relates to new and useful improvements in a dental precision bridge or denture device, and is in the nature of an adjustable precision telescoping tube and bar with or for the male attachments of a dental bridge or denture. It is intended that said telescoping tube and bar be cut to length for a one tooth or several teeth bridge or denture and be permanently imbedded in the plastic or metal or combination body or saddle of the bridge or denture.

It is proposed to characterize the new dental precision bridge or denture device by a nonrotative telescopic tube and bar provided with right angle members mounted on the outer ends of said tube and bar for holding in parallelism the male attachments and jackets, if jackets are used in the abutments, for a removable bridge or denture.

Heretofore, numerous dental paralleling devices have been known and used in the dental profession for placing the male attachments in parallelism, but their construction has been relatively expensive and their use relatively difficult and time consuming. The new device, in accordance with this invention, is exceptionally simple in construction, and simplifies the construction of a dental bridge or denture. It reduces the cost of dental bridges, especially those having plastic bodies, by eliminating the present slow procedure required with former devices. This invention will therefore make available, these desirable removable bridges and other dentures to more people.

The invention further proposes to use support studs where required mounted upon said telescoping bar and tube for resting upon the curvature of the model of the case for which a bridge is being constructed. These studs are quite simple in construction and will add to the accuracy of the finished bridge or denture.

Still further the invention contemplates providing these studs with loops by which they may be slipped on and moved along the said telescoping tube and bar and adjusted to required positions and cut to required lengths.

The invention also proposes exceptionally simple means for holding the telescoping tube and bar in adjusted, extended and retracted positions.

The invention also contemplates modifications embodying the basic principle of having a predetermined parallel appliance of the two male abutments adjustable to the space needed and available. Such modifications are illustrated and described in this specification.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
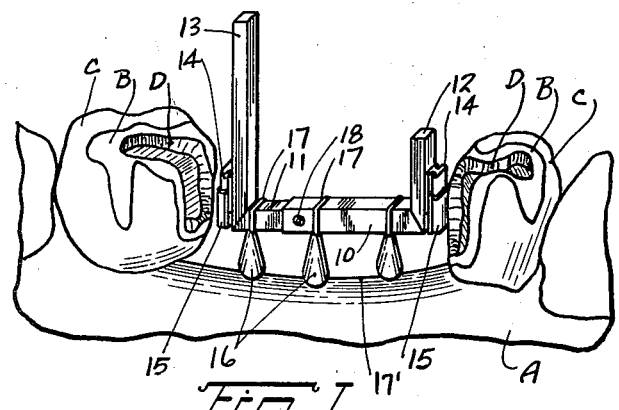
Fig. 1 is a fragmentary enlarged perspective view of a model for a case for which we are to construct a bridge, and a dental precision bridge device constructed in accordance with this invention shown in relation to the model.
Figure 4:
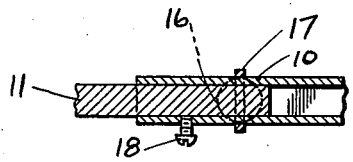
Fig. 4 is a fragmentary horizontal sectional view taken on the line 4—4 of Fig. 2.
Figure 2:
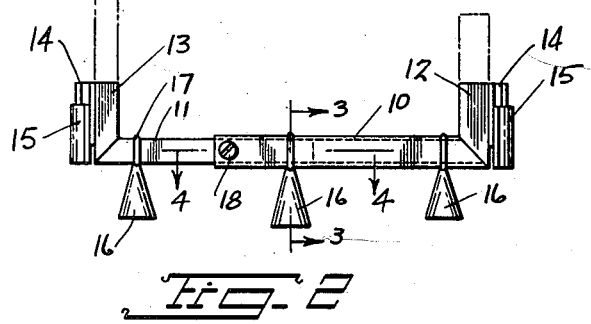
Fig. 2 is a fragmentary enlarged side elevational view of the dental precision bridge device, per se, illustrated with the projecting ends of the right angle members cut off to occlusal requirements.
Figure 3:
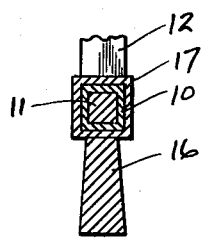
Fig. 3 is a fragmentary vertical sectional view taken on the line 3—3 of Fig. 2.

The dental precision bridge device, in accordance with the first form of the invention disclosed in Figs. 1 to 4 inclusive, may be made of precious or non-precious metals and includes a nonrotative telescoping tube 10 and bar 11 for enabling distance adjustment between abutment seats. These parts have been shown square in tranverse cross section merely for the purpose of illustration. Other non-rotating shapes may also be used. Right angle members 12 and 13 are mounted upon the outer ends of said tube 10 and bar 11 and are for the purpose of holding in parallelism male attachments 14 and the complementary jackets 15 if and when used, of a removable bridge. The particular design, construction and details of the attachments 14 and 15 form no part of this invention and any of the commercial attachments now used may be employed. The cross-sectional shapes of the members 12 and 13 may be made to accommodate and conform to efficiently supporting and placing said male attachments.

Support studs 16 are mounted upon said tube 10 and bar 11. These studs 16 are for the purpose of resting against the curvature 17' of the model for the case for which a bridge or denture is being constructed so as to add to prevent distortion of said tube 10 and bar 11 under the pressure which is necessary in building the body or saddle of the bridge or denture around said tube 10 and bar 11, especially if the body is being constructed of plastic material. Said support studs 16 also serve to create and retain a space for the material to form the body of the bridge or denture. Preferably, the support studs 16 are slidably mounted upon the tube 10 and bar 11. For this purpose each support stud 16 is provided with a small metal loop 17 which engages around the tube 10 or bar 11.

Means is provided for holding the tube 10 and bar 11 in adjusted, extended and retracted positions. This means is in the nature of a set screw 18 threadedly mounted through one wall of the tube 10 and abutting the adjacent face of the bar 11.

The use of the dental precision bridge device may be readily understood from the following brief description. A model A of the case for which a bridge is to be constructed is made in the usual way from the usual materials. Conventional inlays B or crowns or other abutments or piers are constructed for the adjacent natural teeth which are to act as piers or abutments for the removal bridge. These inlays B, etc., are situated in the adjacent teeth of the model, these teeth being indicated by the reference letters C. The inlays B are formed with recesses D in which the jackets 15 (if used) of the male attachments are to be soldered. Sockets for the male attachments may be made with formers without the use of jackets.

The male attachments 14 may be mounted upon the right angle members 12 and 13 with hard wax until their correct positions are located, and then they are permanently soldered. The jackets 15 for the attachments 14, if jackets are used, are mounted on the male attachments. The dental device is then placed in between the teeth C of the model. The projecting top end of the member 13 may be used as a handle for easier handling the dental device. The studs 16 are cut off or filed off so as to properly support the telescoping tube 10 and bar 11 upon the curved portion 17' of the model A at a proper height. The set screw 18 is loosened and the tube 10 and bar 11 are extended until the jackets 15 and male attachments 14 are in proper positions within the recesses D of the inlays B. The jackets 15 if used, are then secured to the inlays B with hard wax. The dental device together with the male attachments 14 are then lifted up and removed from the temporarily secured jackets 15. The jackets 15 are then soldered in accordance with conventional practice to the inlays B. The dental device with the male attachments 14 is then replaced in position between the jackets 15, the projecting top ends of the members 12 and 13 are cut off at the point aligned with the tops of the male attachments, and the bridge is then constructed in the usual way around said dental device, to have the usual saddle, artificial teeth, etc. Thus the dental device will be permanently embedded in the finished bridge, or other denture and the male attachments will be projecting from the same.

Figure 5:
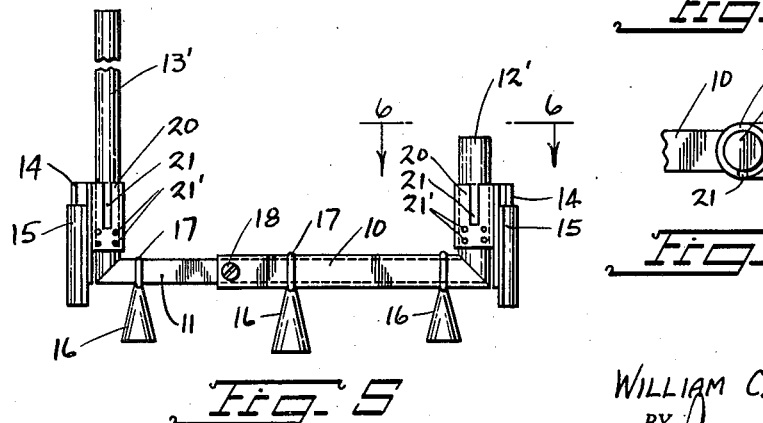
Fig. 5 is a side elevational view of a dental precision bridge device constructed in accordance with another form of this invention.
Figure 6:
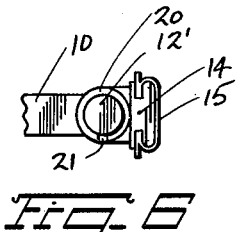
Fig. 6 is a fragmentary plan view looking in the direction of the line 6—6 of Fig. 5.

In Figs. 5 and 6 a modified form of the invention has been disclosed which is very similar to the prior form, distinguishing merely in the fact that the right angle members 12' and 13' are of cylindrical forms. Sockets 20 are slidably and turnably mounted on said right angle members 12' and 13'. These sockets are provided with cutouts 21 and perforations 21' for hard wax and later for solder by which they may be fixed in various longitudinal and various turned positions upon the right angle members 12' and 13'.

The male attachments 14 are permanently mounted on the sockets 20.

In other respects this form of the invention is identical to the previous form and like parts are indicated by like reference numerals.

The operation of this form of the invention is substantially identical to the prior form, distinguishing merely in the fact that the sockets 20 may be fixed in various elevated positions and in various turned positions so that the male attachments 14 in the finally constructed bridge will be directed in the correct arc of the teeth for the case to which the bridge is being constructed.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, which I claim as new and desire to secure by United States Patent is:

1. A dental precision bridge or denture device, comprising a non-rotative telescoping tube and bar, right angle members mounted on the outer ends of said tube and bar for holding male attachments and jackets in parallelism, and male attachments mounted on said right angle members and in parallelism, said right angle members extending above said male attachments to act as handles.

2. A dental precision bridge or denture device, comprising a non-rotative telescoping tube and bar, right angle members mounted on the outer ends of said tube and bar for holding male attachments and jackets in parallelism, male attachments mounted on said right angle members and in parallelism, and support studs mounted upon said tube and bar.

3. A dental precision bridge or denture device comprising a non-rotative telescoping tube and bar, right angle members mounted on the outer ends of said tube and bar for holding male attachments and jackets in parallelism, male attachments mounted on said right angle members and in parallelism, and support studs mounted upon said tube and bar, said support studs being of material which may be readily cut and filed.

4. A dental precision bridge or denture device, comprising a non-rotative telescoping tube and bar, right angle members mounted on the outer ends of said tube and bar for holding male attachments and jackets in parallelism, male attachments mounted on said right angle members and in parallelism and support studs slidably mounted on said tube and bar.

5. A dental precision bridge or denture device, comprising a non-rotative telescoping tube and bar, right angle members mounted on the outer ends of said tube and bar for holding male attachments and jackets in parallelism, male attachments mounted on said right angle members and in parallelism, support studs for said tube and bar, loops mounted upon said support studs and slidably engaging upon said tube and bar.

6. A dental precision bridge or denture device, comprising a non-rotative telescoping tube and bar, right angle members mounted on the outer ends of said tube and bar for holding male attachments and jackets in parallelism, male attachments mounted on said right angle members and in parallelism, support studs mounted on said tube and bar, and means for holding said tube and bar in adjusted extended and retracted positions.

7. A dental precision bridge or denture device, comprising a non-rotative telescoping tube and bar, right angle members mounted on the outer ends of said tube and bar for holding male attachments and jackets in parallelism, male attachments mounted on said right angle members and in parallelism, support studs mounted on said tube and bar, and means for holding said tube and bar in adjusted extended and retracted positions, said support studs being slidably mounted on said tube and bar.

8. A dental precision bridge or denture device, comprising a non-rotative telescoping tube and bar, right angle members mounted on the outer ends of said tube and bar for holding male attachments and jackets in parallelism, male attachments mounted on said right angle members and in parallelism, sockets rotatively and slidably mounted upon said right angle members, and means for holding said sockets in adjusted positions.

9. A dental precision bridge or denture device, comprising a non-rotative telescoping tube and bar, right angle members mounted on the outer ends of said tube and bar for holding male attachments and jackets in parallelism, sockets rotatively and slidably mounted upon said right angle members, means for holding said sockets in adjusted positions, said means comprising slots and perforations engaged through said sockets and abutting said right angle members for receiving solder or other holding material, and male attachments mounted on said sockets in parallelism.

10. A dental precision bridge or denture device, comprising a non-rotative telescoping tube and bar, right angle members mounted on the outer ends of said tube and bar for holding male attachments and jackets in parallelism, sockets rotatively and slidably mounted upon said right angle members, means for holding said sockets in adjusted positions, said right angle members being of cylindrical shapes, said sockets being tubular and mounted on said cylindrical members, and male attachments mounted on said sockets in parallelism.

WILLIAM C. ROTHKRANZ.